United States Patent [19]

Nakayama

[11] Patent Number: 5,225,984
[45] Date of Patent: Jul. 6, 1993

[54] TORQUE DISTRIBUTION CONTROL APPARATUS FOR FOUR WHEEL DRIVE

[75] Inventor: Yasunari Nakayama, Hiroshima, Japan

[73] Assignee: Mazda Motor Corporation, Hiroshima, Japan

[21] Appl. No.: 707,091

[22] Filed: May 29, 1991

[30] Foreign Application Priority Data

Jun. 4, 1990 [JP] Japan .................................. 2-146543
Jun. 14, 1990 [JP] Japan .................................. 2-156273

[51] Int. Cl.⁵ ............................................ B62D 6/00
[52] U.S. Cl. ............................... 364/424.05; 180/140; 180/197; 280/91
[58] Field of Search ................ 364/424.05, 426.02; 180/140-143, 197; 280/91

[56] References Cited

U.S. PATENT DOCUMENTS

| | | | |
|---|---|---|---|
| 4,412,594 | 11/1983 | Furukawa et al. | 180/140 |
| 4,715,466 | 12/1987 | Ishii et al. | 180/140 |
| 4,740,002 | 4/1988 | Miyoshi | 180/142 |
| 4,768,602 | 9/1988 | Inoue et al. | 280/91 |
| 4,941,541 | 7/1990 | Ito et al. | 180/140 |
| 4,949,265 | 8/1990 | Eguchi et al. | 180/140 |
| 5,116,254 | 5/1992 | Sano et al. | 180/142 |

FOREIGN PATENT DOCUMENTS 1247221 3/1988 Japan .
1247223 3/1988 Japan .

Primary Examiner—Gary Chin
Attorney, Agent, or Firm—Sixbey, Friedman, Leedom & Ferguson

[57] ABSTRACT

In the case where the driving torque distribution for four wheels of a car is controlled correspondingly to a lateral acceleration of the car, there is selected either an actual lateral acceleration of the car detected by a lateral acceleration sensor or a lateral acceleration calculated on the basis of a steering angle and a car speed, of which absolute value is smaller, in order to execute torque distribution control. Thus, the turning of the car can be enhanced.

7 Claims, 11 Drawing Sheets

TORQUE DISTRIBUTION CONTROL APPARATUS FOR FOUR WHEEL DRIVE

BACKGROUND OF THE INVENTION

The present invention relates to a torque distribution control apparatus for a four wheel drive.

In general, there has been known a torque distribution control apparatus for a four wheel drive which drives four wheels by engine outputs, wherein the torque distribution for each wheel is not always equivalent but is variably controlled so as to optimize operating conditions.

Japanese Unexamined Patent Publication No. 1-247221 has disclosed a torque distribution change system wherein the driving force of each wheel is absorbed by a brake correspondingly to load movement, which occurs according to the motion of a car such as acceleration, turning and the like, in order to give the driving force corresponding to the load movement for each wheel, because the load movement causes the driving force allowed by the wheels to be nonuniform.

Referring to the torque distribution change system, the car operates almost correspondingly to the change of a steering angle and a car speed on a road of which friction coefficient (hereinafter referred to as $\mu$ if necessary) is high. Accordingly, there are not caused problems. On a low $\mu$ road, however, a slip rate of a tire is great. Consequently, the motion of the car is delayed with the change of the steering angle and car speed. By way of example, even if steering is completed, the lateral load movement remains.

Accordingly, in the case where torque distribution control is to be executed between right and left wheels by detecting an actual lateral acceleration of the car, i.e., based on the lateral load movement, torque distribution is executed by the lateral acceleration which remains on the car even if the steering is completed. In that case, excessive autorotation moment occurs on the car owing to the driving torque which is laterally ununiform. Consequently, the turning of the car is not normally carried out, i.e., straightness is lowered.

Japanese Unexamined Patent Publication No. 1-247223 has disclosed that the turning movement of the car is classified under three parts at the time of turning start, during constant turning and at the time of turning escape, so that the torque distribution control is executed correspondingly to the turning state of the car on the basis of a steering angle and a change rate thereof for front wheels. In other words, the brake absorbs the driving force of the front wheels to decrease the torque distribution for the front wheels such that the small turn of the car can be enhanced at the time of turning start. On the other hand, the brake absorbs the driving force of the rear wheels to decrease the torque distribution for the rear wheels such that the straightness can be enhanced at the time of turning escape. Consequently, the burden of the front and rear tires can become uniform.

In the above-mentioned case, when the steering angle is almost equal to 0, turning escape control is completed. Also at that time, the comparatively great lateral acceleration remains on the car on the low $\mu$ road. When the turning escape control is completed, the driving torque is increased so that the lateral slide (side skid) of the rear wheels is made greater. Consequently, the running stability of the car is damaged. In other words, the turning escape cannot be carried out quickly.

In the case where the next turning is carried out immediately after the turning escape is completed as in S-shaped running, there is executed the torque distribution control at the time of turning start. Consequently, the driving torque is further increased even if the lateral slide is caused on the rear wheels. Thus, the lateral slide is further increased.

SUMMARY OF THE INVENTION

It is an object of the present invention to execute the optimum torque distribution control corresponding to the $\mu$ so that stable turning can be performed on a low $\mu$ road, and particularly to control the lateral slide of rear wheels at the time of turning escape so that the turning of a car can greatly be stabilized.

It is another object of the present invention to execute lateral torque distribution control suitable for the operating conditions of the car by properly using an actual lateral acceleration of the car and the lateral acceleration which is calculated on the assumption that load movement is not delayed on the basis of a steering angle and a car speed.

The present invention provides a torque distribution control apparatus for a four wheel drive comprising torque distribution change means for controlling a quantity of engine outputs to be transmitted to right and left front and rear wheels so as to change the driving torque distribution for the four wheels, torque distribution control means for setting torque distribution ratios for the four wheels correspondingly to a lateral acceleration of the car and controlling the torque distribution change means on the basis of the torque distribution ratios, a lateral acceleration sensor for detecting an actual lateral acceleration of the car in order to execute the torque distribution control for the right and left wheels by the lateral acceleration according to a driver's wishes, a lateral acceleration calculation means for calculating a lateral acceleration to occur on the car correspondingly to a steering angle and a car speed obtained by a steering angle sensor and a car speed sensor, and selection means for selecting the lateral acceleration for control.

More specifically, the lateral acceleration selection means selects either the actual lateral acceleration obtained by the lateral acceleration sensor or the calculated lateral acceleration obtained by the lateral acceleration calculation means in order to execute the torque distribution control for the right and left wheels.

In that case, the torque distribution can be changed by controlling braking devices of the wheels so as to adjust the quantity of engine outputs to be transmitted.

Referring to the torque distribution control apparatus, the lateral acceleration selection means can select the actual lateral acceleration on a high $\mu$ road and the calculated lateral acceleration on a low $\mu$ road. In this case, the lateral torque distribution control is executed correspondingly to the actual load movement on the high $\mu$ road so that the slip of the wheels can surely be controlled to stabilize the turning of the car. Even if the occurrence of the load movement is delayed at the time of turning start on the low $\mu$ road, a lateral torque distribution ratio is increased correspondingly to the steering angle so that the small turn of the car can be attained. In addition, the torque distribution control is early completed correspondingly to the steering angle at the time of turning escape. Consequently, the driving torque, which is laterally ununiform, can be prevented from remaining after the completion of turning (excessive autorotation moment can be prevented from occurring on the car). Thus, the turning of the car can be enhanced.

Referring to a preferred embodiment, the lateral acceleration selection means selects either the actual lateral acceleration or the calculated lateral acceleration, of which absolute value is smaller.

As a result, the lateral torque distribution control can appropriately be executed correspondingly to μ of the road without detecting the same. In other words, the difference between the actual lateral acceleration and the calculated lateral acceleration is small on the high μ road. Consequently, the lateral torque distribution control is executed correspondingly to the actual load movement of the car. On the low μ road, slip can be prevented by the control of the actual lateral acceleration, of which absolute value is smaller, at the time of turning start. Furthermore, the turning can be enhanced by the control of the calculated lateral acceleration, of which absolute value is smaller, at the time of turning escape.

Referring to another preferred embodiment, the torque distribution control means stops control when the actual lateral acceleration and the calculated lateral acceleration are numbers of which signs are reverse to each other.

More specifically, when the calculated lateral acceleration is changed from a positive number to a negative one in meander running, the actual lateral acceleration is still the positive number. In that case, if the absolute value of the calculated lateral acceleration having a minus sign is gradually increased, that of the actual lateral acceleration having a plus sign is gradually decreased. Accordingly, when the lateral acceleration, of which absolute value is smaller, is selected, the lateral acceleration for control is rapidly changed from the calculated lateral acceleration having the minus sign to the actual lateral acceleration having the plus sign. If the control is stopped when the actual lateral acceleration and the calculated lateral acceleration have signs which are reverse to each other, the sign of the lateral acceleration for control can be prevented from being rapidly changed.

Furthermore, the present invention provides a torque distribution control apparatus for a four wheel drive comprising means for detecting the steering state of the car, turning state decision means for deciding whether the car is in the state of turning start or turning escape on the basis of the steering state thereof, and turning escape decision maintenance means for maintaining the decision of turning escape by stopping the decision of the turning state decision means until the actual lateral acceleration or a lateral slide angle is equal to or smaller than a predetermined value when the turning state decision means decides that the car is in the state of turning escape, wherein the torque distribution control means receives signals from the turning state decision means and turning escape decision maintenance means and stops the control when it is not decided that the car is in the state of turning escape.

In the case where the motion of the car is not greatly delayed with the change of the steering angle and car speed and the lateral acceleration or lateral slide angle is equal to or smaller than the predetermined value at almost the same time that the turning is completed (the steering angle is 0) on the high μ road, it is decided that the steering is almost in the state of turning escape.

On the low μ road, the comparatively great lateral acceleration or lateral slide angle remains even if the turning is completed. Consequently, the decision of the turning escape is maintained by the turning escape decision maintenance means until the lateral acceleration or lateral slide angle is equal to or smaller than the predetermined value even if the turning is completed. Thus, the torque distribution control is not completed. Even if the next turning is started, the prior turning control is not completed until the actual lateral acceleration is equal to or smaller than the predetermined value. Consequently, the torque distribution control against a driver's wishes owing to the remaining actual lateral acceleration can be prevented.

In that case, referring to a preferred embodiment, the torque distribution control means includes means for setting torque distribution ratios of the wheels correspondingly to the lateral acceleration of the car, and torque distribution ratio correction means for receiving the signals from the turning state decision means and turning escape decision maintenance means and differently correcting the torque distribution ratios of the wheels when it is decided that the car is in the state of turning start and turning escape.

Thus, in the case where the actual lateral acceleration remains at the time of the completion of the turning, the turning escape control is continued. Consequently, the straight running can be attained.

Referring to a further preferred embodiment, the torque distribution ratio correction means performs correction such that the torque distribution for the rear wheels in the state of turning escape is made smaller than that in the state of turning start.

Thus, even if the turning is completed, there can be continued the torque distribution control which stabilizes the running so as to control the lateral slide of the rear wheels at the time of turning escape. Consequently, the straight running can be attained. Furthermore, in the case where the turning start and escape are alternately carried out, the running of the car can be stabilized.

Furthermore, it is preferred that the lateral acceleration selection means selects either the actual lateral acceleration or the calculated lateral acceleration, of which absolute value is smaller, and the torque distribution control means completes the control when either the actual lateral acceleration or the calculated lateral acceleration, of which absolute value is greater, is equal to or smaller than the predetermined value.

These and other objects, features and advantages of the present invention will become more apparent upon a reading of the following detailed description and drawings.

DETAILED DESCRIPTION OF A PREFERRED EMBODIMENT

A preferred embodiment of the present invention will be described with reference to the drawings.

Explanation of an entire structure

Figure 1:
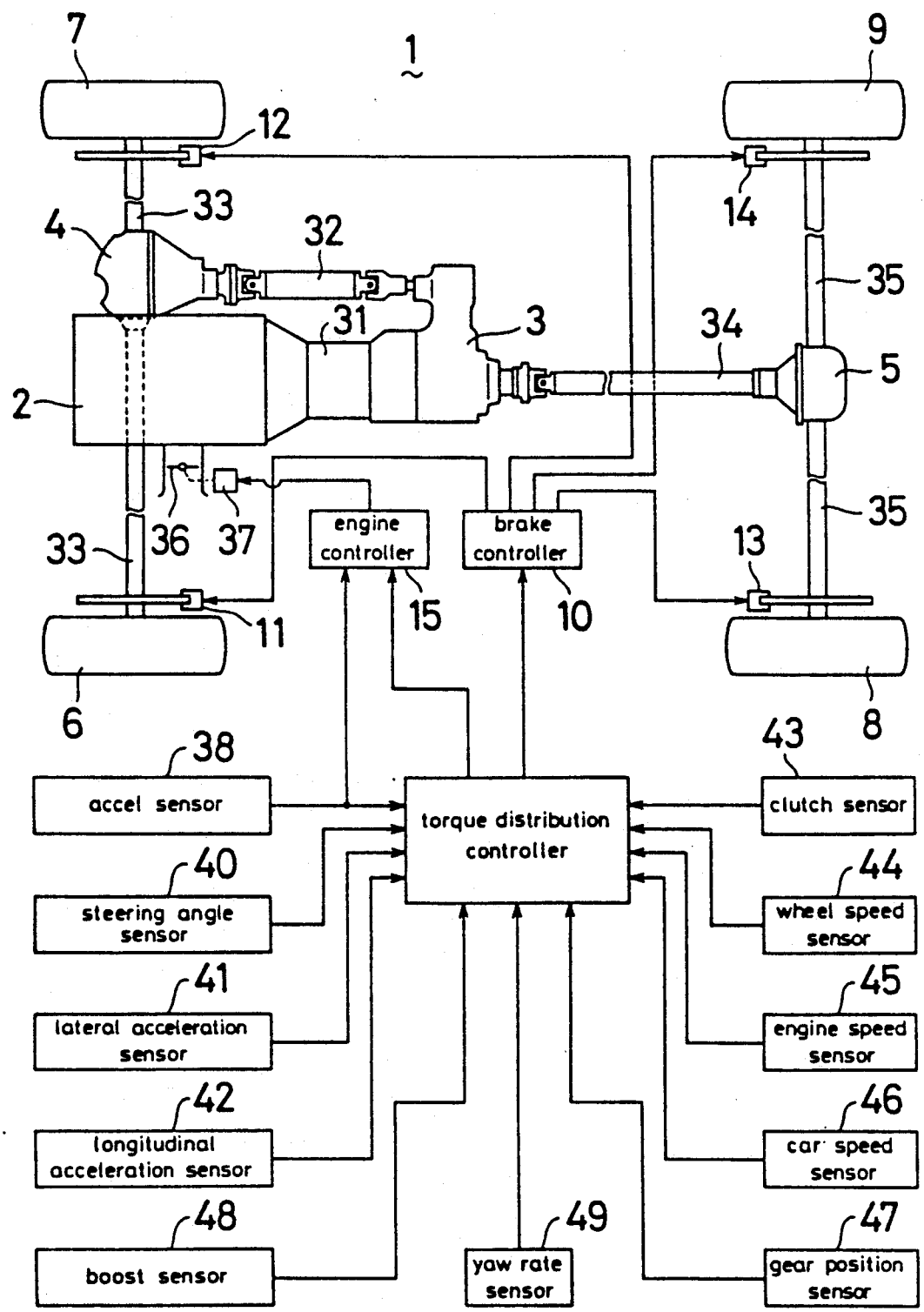
FIG. 1 is a diagram showing the entire structure according to an embodiment of the present invention.

As shown in FIG. 1, an output of an engine 2 is inputted to a transfer 3 through a transmission 31. The transfer 3 has a center differential for equally transmitting an engine output to front and rear wheel sides. A front differential 4 is connected to an output shaft 32 on the front wheel side of the transfer 3. Right and left front wheels 6 and 7 are connected to the front differential 4 through a front wheel driving shaft 33. Similarly, a rear differential 5 is connected to an output shaft 34 on the rear wheel side of the transfer 3. Right and left rear wheels 8 and 9 are connected to the rear differential 5 through a rear wheel driving shaft 35.

A brake controller 10 as torque distribution change means includes a braking pressure control valve and an actuator. The braking pressure control valve separately controls the braking pressure to be supplied to braking devices 11 to 14 provided on the wheels 6 to 9. A throttle valve 36 of the engine 2 has its opening adjusted by a throttle motor 37. An engine controlrrer 15 as engine output change means receives an accel signal from an accel sensor 38 which detects a quantity of accel operated by a driver, and then outputs an operation control signal to the throttle motor 37 so as to adjust the opening of the throttle valve 36 correspondingly to the quantity of accel operated by the driver. In addition, the engine controller 15 receives a control signal from a torque distribution controller 16 and changes the engine output in order to obtain the engine output torque required to change torque distribution.

The torque distribution controller 16 receives signals from the accel sensor 38, and various signals for measuring an operation quantity or momentum to control the torque distribution for the wheels 6 to 9. Then, the torque distribution controller 16 outputs a control signal to the brake controller 10 and the engine controller 15. Output sources for the various signals are as follows;

a steering angle sensor 40, a lateral acceleration sensor 41 for detecting a lateral acceleration of a car, a longitudinal acceleration sensor 42 for detecting a longitudinal acceleration of the car, a clutch sensor 43 for detecting the connection of a clutch, a wheel speed sensor 44 for detecting an engine speed of the wheels 6 to 9, an engine speed sensor 45 for detecting the engine speed, a car speed sensor 46, a gear position sensor 47 for detecting a gear position (gear speed) of a transmission 25, a boost sensor 48 for detecting a boost of the engine 2, and a yaw rate sensor 49 for detecting a yaw rate of the car.

More specifically, the torque distribution controller 16 sets a torque distribution ratio (hereinafter referred to as a lateral distribution ratio if necessary) of the left wheels 6 and 8 to the right wheels 7 and 9 and a torque distribution ratio (hereinafter referred to as a longitudinal distribution ratio if necessary) of the front wheels 6 and 7 to the rear wheels 8 and 9 correspondingly to the load movement and turning state of the car on the basis of output signals from the sensors. In addition, the torque distribution controller 16 controls the brake controller 10 and the engine controller 15 on the basis of the torque distribution ratios mentioned above.

Figure 2:
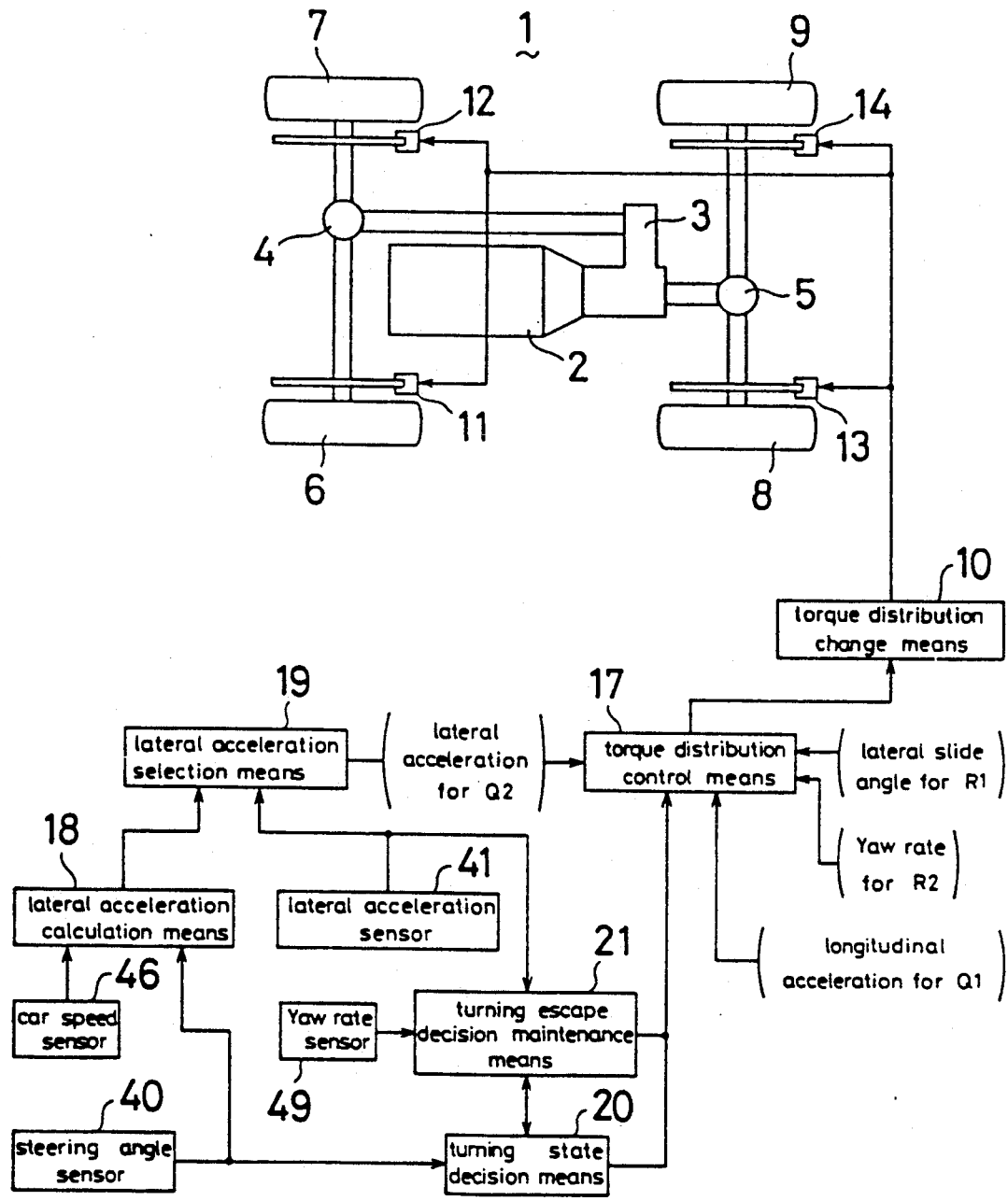
FIG. 2 is a diagram showing the conceptual structure of a torque distribution controller.

FIG. 2 shows the conceptual structure of the torque distribution controller 16.

Torque distribution control means 17 sets the torque distribution ratios and controls the torque distribution change means 10 on the basis of the torque distribution ratios thus set.

The longitudinal acceleration sensor 42 sets a longitudinal distribution ratio Q1 on the basis of the load movement (longitudinal acceleration).

To set a lateral distribution ratio Q2 on the basis of the load movement (lateral acceleration), there are provided lateral acceleration calculation means 18 and lateral acceleration selection means 19. The lateral acceleration calculation means 18 calculates a lateral acceleration to occur on the car correspondingly to the steering angle and car speed obtained by the steering angle sensor 40 and car speed sensor 46. The lateral acceleration selection means 19 selects either an actual lateral acceleration obtained by the lateral acceleration sensor 41 or a calculated lateral acceleration obtained by the lateral acceleration calculation means 18 in order to execute torque distribution control.

Correspondingly to a friction coefficient of a road is changed a region in which the torque distribution control is executed on the basis of the load movement.

To set a longitudinal distribution ratio R1 and a lateral distribution ratio R2 corresponding to the turning state, there are provided turning state decision means 20 and turning escape decision maintenance means 21. The turning state decision means 20 decides the turning state of the car on the basis of the steering angle obtained by the steering angle sensor 40 as steering state detection means. The turning escape decision maintenance means 21 maintains the decision of the turning escape obtained by the turning state decision means 20.

The longitudinal distribution ratio R1 is set on the basis of a lateral slide (side skid) angle of the rear wheels 8 and 9. The lateral distribution ratio R2 is set on the basis of the yaw rate of the car. In addition, the longitudinal distribution ratio R1 is differently set correspondingly to the turning state of the car.

Explanation of the brake controller 10

Figure 3:
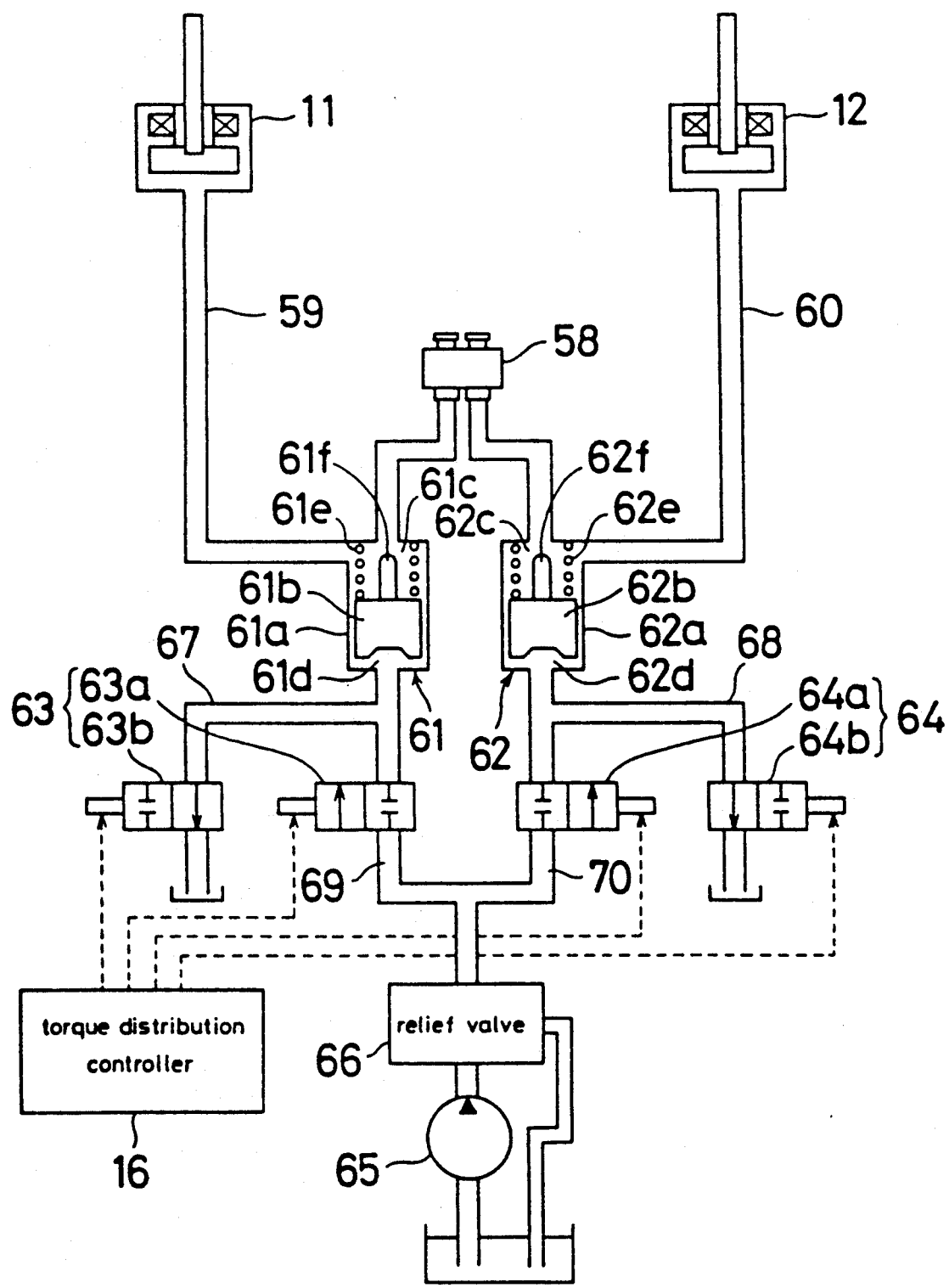
FIG. 3 is a circuit diagram showing torque distribution change means (a brake controller)

In FIG. 3, at 59 is indicated a first hydraulic line for a braking device 11 of the left front wheel 6, and at 60 is indicated a second hydraulic line for a braking device 12 of the right front wheel 7. The first and second hydraulic lines 59 and 60 have first and second braking pressure control valves 61 and 62 provided therebetween. The first and second braking pressure control valves 61 and 62 control the supply of the braking pressure. In addition, the first and second braking pressure control valves 61 and 62 have cylinders 61a and 62a partitioned into variable volume chambers 61c and 62c, and control chambers 61d and 62d by pistons 61b and 62b. The variable volume chambers 61c and 62c supply the braking pressure generated by a master cylinder 58 to the braking devices 11 and 12.

The pistons 61b and 62b are energized such that the volume of the variable volume chambers 61c and 62c is increased by springs 61e and 62e, and move such that the variable volume chambers 61c and 62c are reduced against the springs 61e and 62e by the control pressure introduced into the control chambers 61d and 62d. Furthermore, the pistons 61b and 62b have check valves 61f and 62f for closing braking pressure inlets of the variable volume chambers 61c and 62c according to the movement mentioned above. Accordingly, the control pressure is introduced into the control chambers 61d and 62d so that the pistons 61b and 62b move against the springs 61e and 62e. Consequently, there is blocked the space between the master cylinder 58 and the variable volume chambers 61c and 62c. In addition, the braking pressure in the variable volume chambers 61c and 62c is supplied to the braking devices 11 and 12.

There are provided first and second actuators 63 and 64 having pressure increasing electromagnetic valves 63a and 64a and pressure reducing electromagnetic valves 63b and 64b to operate the braking pressure control valves 61 and 62. The pressure increasing electromagnetic valves 63a and 64a are provided on control pressure supply lines 69 and 70. The control pressure supply lines 69 and 70 are lead to the control chambers 61d and 62d of the braking pressure control valves 61 and 62 through an oil pump 65 and a relief valve 66. The pressure reducing electromagnetic valves 63b and 64b are provided on drain lines 67 and 68 which are lead from the control chambers 61d and 62d. The electromagnetic valves 63a, 63b, 64a and 64b are opened or closed by the signals from the torque distribution controller 16. When the pressure increasing electromagnetic valves 63a and 64a are opened and the pressure reducing electromagnetic valves 63b and 64b are closed, the control pressure is introduced into the control chambers 61d and 62d of the braking pressure control valves 61 and 62. When the pressure increasing electromagnetic valves 63a and 64a are closed and the pressure reducing electromagnetic valves 63b and 64b are opened, the control pressure is discharged from the control chambers 61d and 62d.

Braking devices 13 and 14 of the right and left rear wheels 8 and 9, which are not shown, have the same structures as those of the braking devices 11 and 12 of the front wheels 6 and 7. With the above-mentioned structures, the independent braking pressure can be applied to the braking devices 11 to 14.

There will be described the torque distribution controller 16.

Explanation of the entire flow of processing

Figure 4:
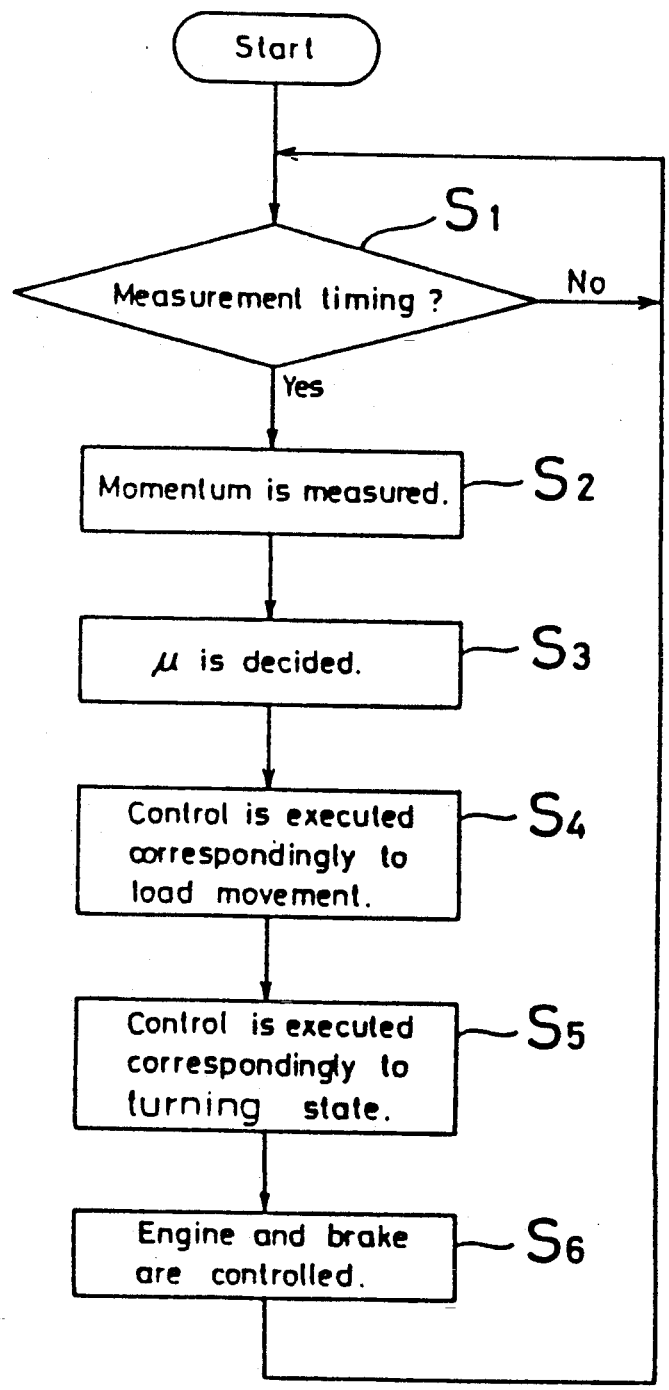
FIG. 4 is a flow chart of the entire torque distribution control.

FIG. 4 shows the entire flow of processing. When a predetermined measurement timing is obtained after starting, the accel stroke, steering angle, lateral acceleration, longitudinal acceleration, clutch connection, wheel speed, car speed, gear position, boost, and yaw rate are measured by the signals from the sensors 38, 40 to 49 shown in FIG. 2 (Steps S1 and S2).

Then, there are carried out the decision of $\mu$ of the road, setting of the longitudinal and lateral distribution ratios Q1 and R2 corresponding to the load movement, and setting of the longitudinal and lateral distribution ratios R1 and R2 corresponding to the turning state. The brake controller 10 and the engine controller 15 are controlled on the basis of Q1, Q2, R1 and R2 (Steps S3 to S6).

According to the present embodiment, the longitudinal distribution ratios Q1 and R1 are set such that the longitudinal distribution is uniform at 0, the driving torque of the front wheels 6 and 7 is 0 (and that of the rear wheels 8 and 9 is the maximum) at +0.5, and the driving torque of the rear wheels 8 and 9 is 0 (and that of the front wheels 6 and 7 is the maximum) at −0.5. The lateral distribution ratios Q2 and R2 are set such that the lateral distribution is uniform at 0, the driving torque of the left wheels 6 and 8 is 0 (and that of the right wheels 7 and 9 is the maximum) at +0.5, and the driving torque of the right wheels 7 and 9 is 0 (and that of the left wheels 6 and 8 is the maximum) at −0.5.

Explanation of $\mu$ decision

Figure 5:
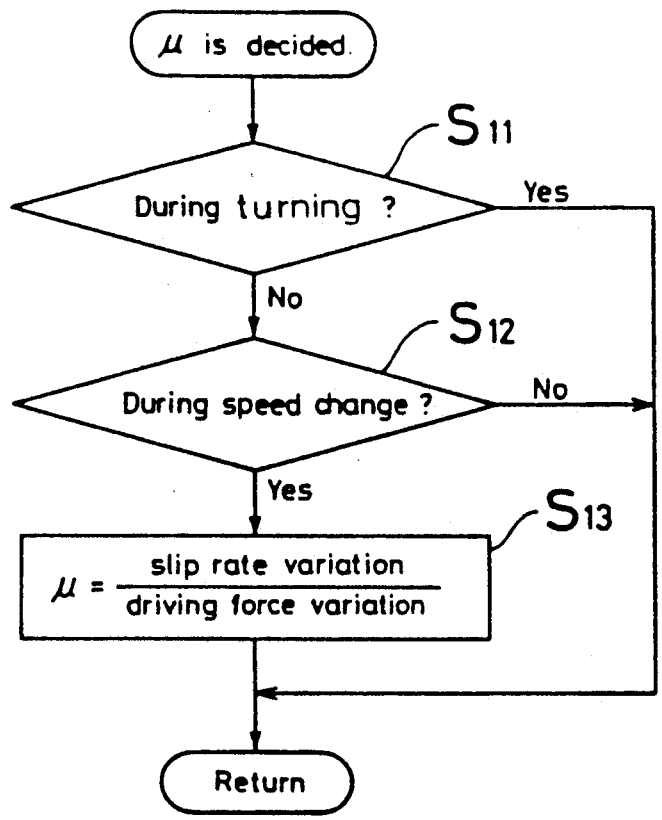
FIG. 5 is a flow chart for μ decision.

Friction coefficient detection means decides and detects a friction coefficient depending on the change of the wheel speed according to that of the driving force by utilizing the fact that the driving force is equal to 0 in the straight running state of the car when changing the speed thereof. As shown in a flow of FIG. 5, if the signals from the steering angle sensor 40 and clutch sensor 43 detect that the car is in the straight running state and the speed thereof is being changed, $\mu$ is decided by the following formula (Steps S11 to S13).

$$\mu = (\text{slip rate variation})/(\text{driving force variation})$$

Figure 6:
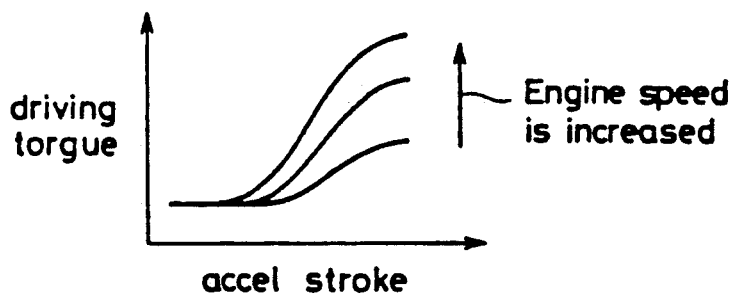
FIG. 6 is a characteristic chart showing the relationship between an output torque and an accel stroke.
Figure 7:
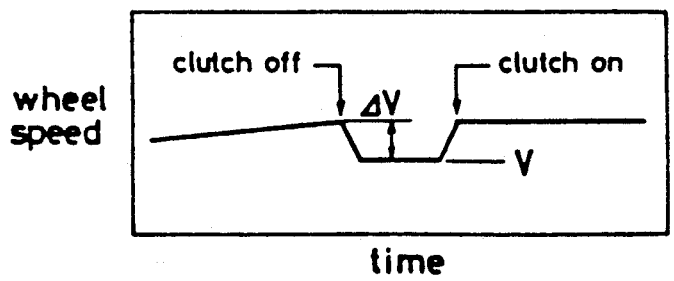
FIG. 7 is a diagram showing the change of a wheel speed according to the connection and interception of a clutch.

In this case, the driving force variation can be obtained as follows. The accel stroke and an engine speed (RPM) are detected by the accel sensor 38 and engine speed sensor 45. The driving torque of the engine is calculated on the basis of the accel stroke and engine speed (RPM) with reference to a map shown in FIG. 6. Then, the driving torque is multiplied by a gear ratio before speed change which is detected by the gear position sensor 47. Consequently, the driving force variation can be obtained. The slip rate variation can be obtained by the wheel speed sensor 44 as follows.

$$\text{Slip rate variation} = -\Delta v/(v + \Delta v)$$

where $\Delta v$ is a wheel speed variation according to the speed change and v is the minimum value of the wheel speed during the speed change shown in FIG. 7.

Explanation of load movement correspondence control

Figures 8, 9:
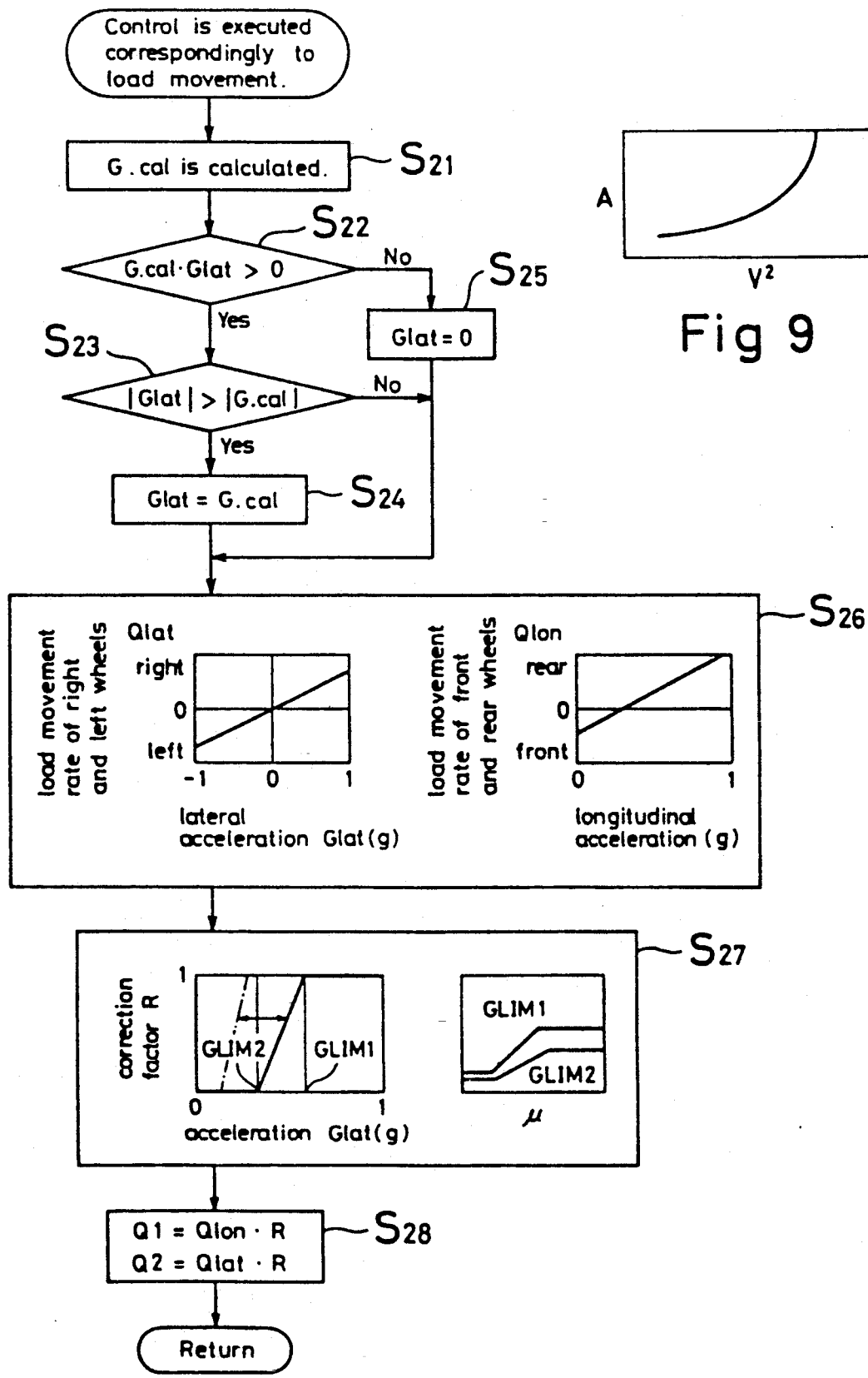
FIG. 8 is a flow chart of load movement correspondence control.
FIG. 9 is a characteristic chart showing the relationship between the wheel speed and a factor A.

The present control is executed in accordance with a flow shown in FIG. 8. Basically, the torque distribution control is executed by an actual lateral acceleration Glat and an actual longitudinal acceleration detected by the lateral acceleration sensor 41 and longitudinal acceleration sensor 42. In the case where the occurrence of the lateral acceleration is delayed with the steering on the low road, Glat is corrected by an ideal non-delayed calculated lateral acceleration G.cal which is obtained on the high road. In addition, a region, in which the present control is executed, is changed correspondingly to $\mu$ of the road.

First, there is calculated by the following formula the ideal non-delayed lateral acceleration G.cal according to the change of the steering angle and car speed (Step S21).

$$G.cal = v^2/(1+Av^2) \cdot \theta/l$$

where v is the lowest wheel speed obtained by the wheel speed sensor 44, $\theta$ is a steering angle, and l is a wheel base. A is a factor for obtaining the movement characteristics of the car on the high $\mu$ road. The factor A is obtained with reference to a characteristic map shown in FIG. 9.

When the product of G.cal and Glat is a positive number, G.cal is selected as Glat for control if an absolute value of G.cal is smaller than that of Glat. If not so, Glat is selected. When the product is 0 or a negative number, Glat for control is forced to be 0 (Steps S22 to S25).

More specifically, it is decided whether the product is the positive or negative number in order to decide whether both G.cal and Glat are positive or negative numbers, or numbers of which signs are reverse to each other. When both G.cal and Glat are positive or negative numbers, the one having the smaller absolute value, is selected as the lateral acceleration for control. As in the case where the turning is changed from right to left, when G.cal and Glat have signs which are reverse to each other owing to the delay of occurrence of the lateral acceleration, the torque distribution control of the lateral acceleration is forbidden.

There is obtained a load movement rate Qlat between the left wheels 6 and 8 and the right wheels 7 and 9 by Glat for control. There is obtained a load movement rate Qlon between the front wheels 6 and 7 and the rear wheels 8 and 9 by the longitudinal acceleration (Step S26).

Then, there are determined constants GLIM1 and GLIM2 for setting the execution range of the load movement correspondence control on the basis of the value of $\mu$. A torque distribution ratio correction factor R is obtained by the constants GLIM1 and GLIM2. The correction factor R is multiplied by the longitudinal wheel load movement rate Qlon and the lateral wheel load movement rate Qlat, respectively. Consequently, there can be obtained the longitudinal torque distribution ratio Q1 and lateral torque distribution ratio Q2 corresponding to the load movement (Steps S27 and S28).

In the region in which the longitudinal acceleration and lateral acceleration are low, the correction factor R corrects the torque distribution ratios Q1 and Q2 to be decreased when the acceleration is decreased. GLIM1 and GLIM2 determine upper and lower limit values of the acceleration in which the correction factor R corrects the torque distribution ratios Q1 and Q2. If the acceleration is greater than GLIM1, the load movement rates Qlon and Qlat are the torque distribution ratios Q1 and Q2 (R=1). If the acceleration is smaller than GLIM2, R is equal to 0, i.e., the torque distribution ratios Q1 and Q2 are equal to 0.

As shown in a right diagram of Step S27, when $\mu$ is made lower, GLIM1 and GLIM2 are decreased and the difference thereof is reduced by torque distribution execution region change means. In other words, a correction factor characteristic line is shifted to the left when $\mu$ is made lower as shown in a dashed line in a left diagram of Step S27. Consequently, the region, in which the load movement correspondence control is executed, is enlarged toward the small acceleration side. In addition, even if the acceleration is low, the control can be executed with a great torque distribution ratio corresponding to the load movement rate. When $\mu$ is high, the correction factor characteristic line is shifted to the right. Consequently, the load movement correspondence control is not executed until the acceleration is made comparatively great.

Turning state correspondence control

Basically, the longitudinal distribution ratio R1 is determined on the basis of the lateral slide angle of the rear wheels 8 and 9. In addition, the lateral distribution ratio R2 is determined so as to obtain a target yaw rate. The distribution ratios R1 and R2 are corrected correspondingly to the turning state of the car.

Figure 10:
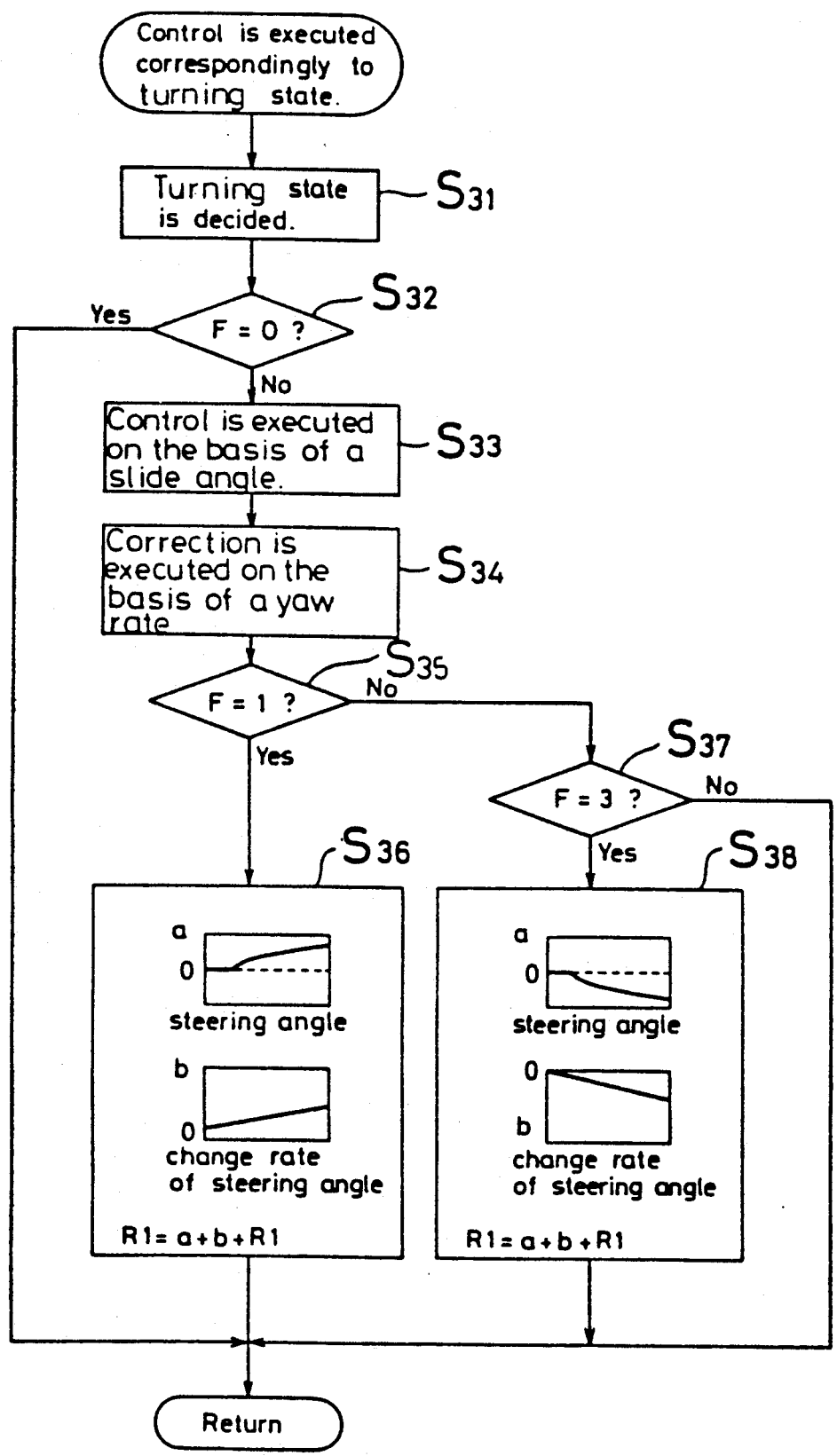
FIG. 10 is a flow chart of turning state correspondence control.

More specifically, the control is executed in accordance with a flow shown in FIG. 10. A turning state decision flag F is used for the control. The flag F means the following.

F=0 ... straight running
F=1 ... turning start
F=2 ... constant turning
F=3 ... turning escape Referring to the present control, the turning state is decided (Step S31). If the car is in the state of turning (Step S32), the longitudinal distribution ratio R1 is determined depending on the lateral slide angle of the rear wheels 8 and 9 and the lateral distribution ratio R2 is then determined depending on the yaw rate (Steps S33 and S34). If the car is in the state of turning start and turning escape, the longitudinal distribution ratio R1 is corrected and controlled on the basis of the steering angle and change rate thereof (Steps S35 to S38).

Decision of turning state (Step S31)

Figure 11:
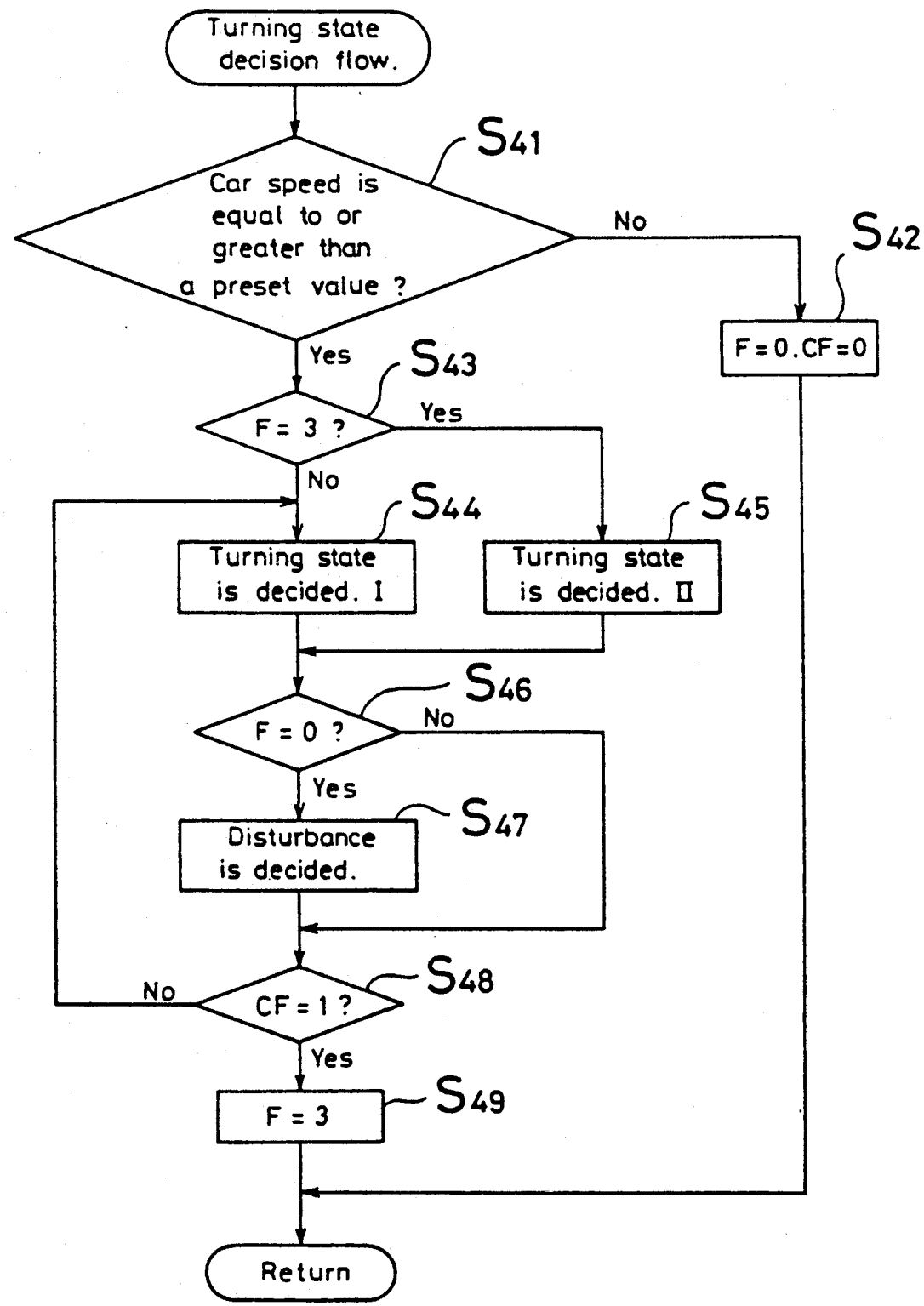
FIG. 11 is a flow chart for turning state decision.

The flow of decision control is shown in FIG. 11. Basically, the turning state of the car is decided depending on the steering angle and change rate thereof obtained by the steering angle sensor 40. The results of decision are corrected by the lateral acceleration and yaw rate obtained by the lateral acceleration sensor 41 and yaw rate sensor 49 respectively. A second flag CF is used for correction. The CF flag means the following.

CF=0 ... Correction is not necessary for the change of movement of the car.
CF=1 ... Correction is necessary for the change of movement of the car.

When the car speed is smaller than a preset value (the car speed is extremely low), the lateral slide of the car does not matter. Consequently, F and CF are set to 0 irrespective of the steering angle and change rate thereof (Steps S41 and S42). At Step S43, it is decided whether the former decision is F=3 (turning escape) or not. If the former decision is not F=3, turning state decision I is carried out in accordance with a map shown in FIG. 12 (Step S44). The contents of decision are as follows.

The steering angle is smaller than $\theta1$ and the change rate of steering angle is smaller than $\dot\theta1$;
F=0 (straight running), CF=CF (CF setting is not changed)

The steering angle is equal to or greater than $\theta1$, and the change rate of steering angle is the positive number (the steering angle is increased) and is equal to or greater than $\dot\theta2$, or is equal to or greater than $\dot\theta1$;
F=1 (turning start), CF=CF The steering angle is equal to or greater than $\theta1$ and the change rate of steering angle is $\dot\theta2$ to $\dot\theta3$;
($\dot\theta3$ is the negative number: the steering angle is decreased)
F=2 (constant turning), CF=CF The steering angle is equal to or greater than $\theta1$ and the change rate of steering angle is $\dot\theta3$ to $\dot\theta4$;

($\dot\theta3 > \dot\theta4$)

F=3 (turning escape), CF=CF
The change rate of steering angle is equal to or smaller than $\dot\theta4$;
F=3, CF=1

Figure 13:
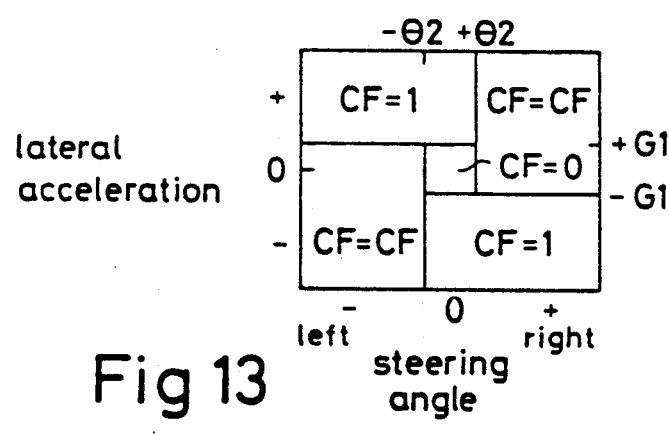
FIG. 13 is a map chart for turning state decision II.

If the decision is F=3 (turning escape) in Step S43, turning state decision II is carried out in accordance with a map shown in FIG. 13 (Step S45). Even if the steering is completed at the time of turning escape (the steering angle is about 0), it is necessary to correct the change of movement of the car until the absolute value of the lateral acceleration is equal to or smaller than a predetermined value 3G13. Consequently, CF is set as follows.

The steering angle is equal to or smaller than $+\theta2$ (the entire region of the left steering angle, and the right steering angle from 0 to a predetermined value $+\theta2$) and the lateral acceleration is equal to or greater than $+G1$ (a rightward acceleration is about 0), or the steering angle is equal to or greater than $-\theta2$ (the entire region of the right steering angle, and the left steering angle from 0 to a predetermined value $-\theta2$) and the lateral acceleration is equal to or smaller than $-G1$ (a leftward acceleration is about 0); CF=1

The steering angle is $+\theta2$ to $-\theta2$ and the lateral acceleration is $+G1$ to $-G1$; CF=0

Other regions; CF=CF

Figure 14:
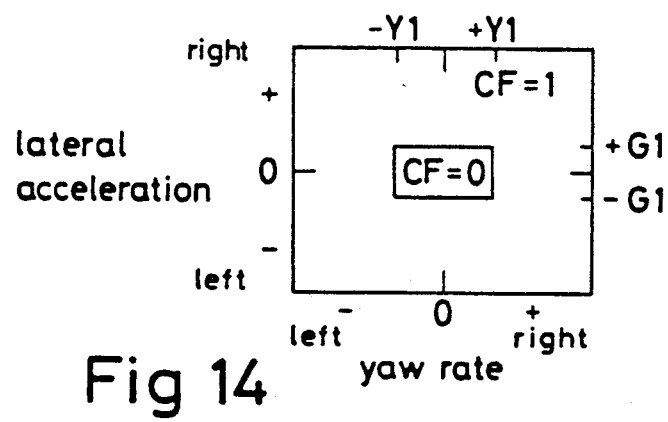
FIG. 14 is a map chart for distrubance decision.

If F=0 (straight running), disturbance decision is carried out in accordance with a map shown in FIG. 14 (Steps S46 and S47). Only in the case where the yaw rate is $-Y1$ to $+Y1$ and the lateral acceleration is $-G1$ to $+G1$, CF is set to 0. In other cases, the disturbance occurs (it is necessary to correct the change of movement of the car) so that CF is set to 1.

As a result of decision, if CF is set to 1, the turning state decision flag F is forced to be 3 (turning escape) and is continuously set to 3 until CF is equal to 0. If CF is set to 0, the turning state decision I is carried out (Steps S48 and S49).

Lateral slide angle control (Step S33)

Figure 15:
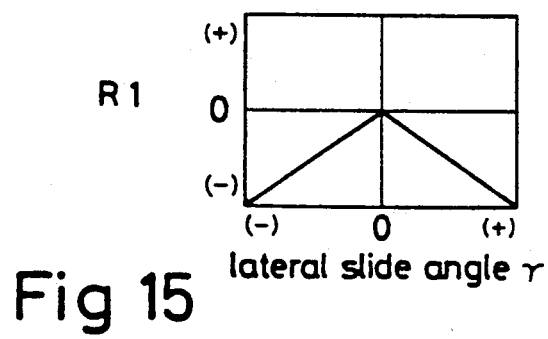
FIG. 15 is a map chart for setting a longitudinal torque distribution ratio depending on a lateral slide angle.

The longitudinal distribution ratio R1 is determined depending on a lateral slide angle by means of the steering angle sensor 40, car speed sensor 46 and yaw rate sensor 49. In other words, there is obtained by the following formula a lateral slide angle $\gamma$ of the rear wheels 8 and 9 owing to the yaw movement of the car. With reference to a characteristic map shown in FIG. 15, the longitudinal distribution ratio R1 is determined.

$$\gamma = Yaw.r \cdot lr/V$$

Yaw.r; actual yaw rate
lr; distance from the center of gravity to the rear wheels of the car
V; car speed In this case, the lateral slide angle $\gamma$ is equal to 0, the longitudinal distribution ratio R1 is equal to 0. If the lateral slide angle $\gamma$ is increased in plus and minus directions, the longitudinal distribution ratio R1 is increased in the minus direction. Referring to the yaw rate Yaw.r, the right turning is set in the plus direction. Accordingly, $\gamma$ having a plus or minus sign corresponds to the right or left turning of the car.

Yaw rate correction

The lateral distribution ratio R2 is determined depending on the yaw rate as follows. First, there is calculated the target yaw rate Y.cal on the high $\mu$ road by the lowest wheel speed v of four wheels, steering angle $\theta$ and wheel base l. Then, the lateral distribution ratio R2 is feed-back controlled so as to obtain the target yaw rate Y.cal from the difference between the target yaw rate Y.cal and the actual yaw rate Yaw.r.

In this case, the target yaw rate Y.cal is obtained by the following formula.

$$Y.cal = v/(1+Av^2) \cdot \theta/l$$

where A is a factor for obtaining the characteristic of movement of the car on the high $\mu$ road.

There is obtained $\Delta Y = Y.cal - Yaw.r$. There is obtained a driving torque difference of the right and left wheels corresponding to $\Delta Y$. Then, there is found a ratio of the driving torque difference to a driver's required torque. The ratio thus obtained is the lateral distribution ratio R2.

$$R2 = k \cdot \Delta Y/Tr$$

where k is a constant for obtaining the driving torque difference of the right and left wheels corresponding to $\Delta Y$, and Tr is the driver's required torque. Tr can be obtained as follows. In other words, an accel stroke and an engine speed (RPM) are detected by the accel sensor 38 and the engine speed sensor 45. The driving torque of the engine is calculated on the basis of the accel stroke and engine speed (RPM) with reference to a map shown in FIG. 6. The driving torque thus obtained is multiplied by a gear ratio detected by the gear position sensor 47.

Correction of R1 on the basis of the results of turning state decision

As seen from the characteristic chart for correction factors a and b and the formula for R1 (R1=a+b+R1) in Step S36, R1 is corrected so as to be increased when the steering angle and change rate thereof are increased at the time of turning start (F=1).

As seen from the characteristic chart for the correction factors a and b and the formula for R1 (R1=a+b+R1) in Step S38, R1 is corrected so as to be decreased when the steering angle and change rate thereof are increased at the time of turning escape (F=3).

Engine and brake control

By the following formula is calculated a torque Ts which is required to execute the torque distribution control depending on the longitudinal distribution ratio $K1=Q1+R1$ and the lateral distribution ratio $K2=Q2+R2$.

$$Ts = 4 \times (|K1| + 0.5) \times (|K2| + 0.5) \times Tr$$

The engine controller 15 is controlled in order to obtain the required torque Ts. By the following formulas are calculated the braking torques TBFR (right front wheel), TBFL (left front wheel), TBRR (right rear wheel) and TBRL (left rear wheel) to be applied to the wheels 6 to 9 on the basis of the distribution ratios K1 and K2. The brake controller 10 is controlled in order to obtain the braking torques mentioned above.

$$TBFR = Ts - 4(0.5 - K1) \times (0.5 + K2) \times Ts$$

$$TBFL = Ts - 4(0.5 - K1) \times (0.5 - K2) \times Ts$$

$$TBRR = Ts - 4(0.5 + K1) \times (0.5 + K2) \times Ts$$

$$TBRL = Teng - 4(0.5 + K1) \times (0.5 - K2) \times Ts$$

Function of an embodiment and a comparative example

Load movement correspondence control

Figure 16:
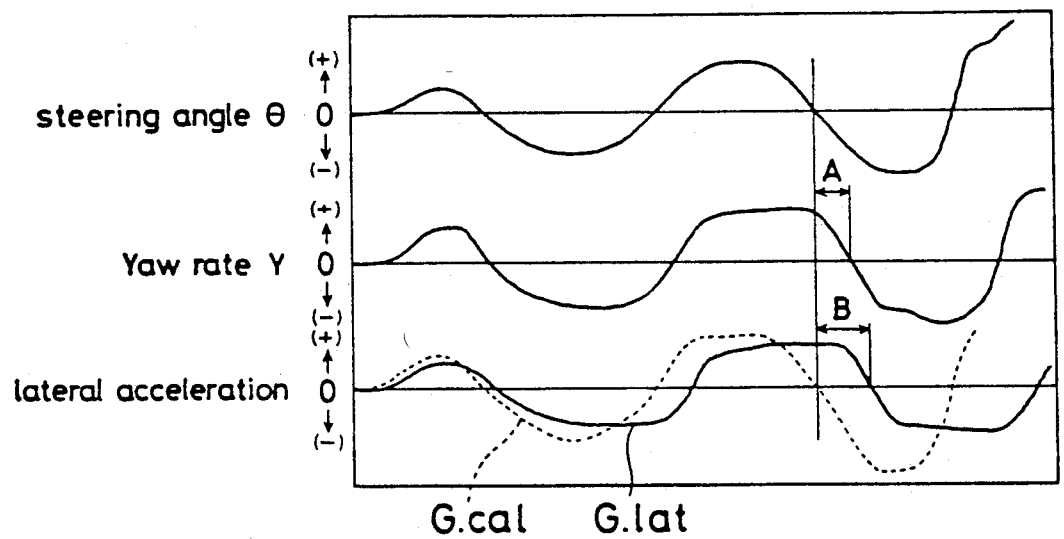
FIG. 16 is a diagram showing the relationship among a steering angle θ, a yaw rate Y and an actual lateral acceleration Glat according to a comparative example.

First, there will be described a comparative example in which the load movement control is executed by using only the actual lateral acceleration Glat. FIG. 16 shows the relationship among the steering angle $\theta$, the yaw rate Y and the actual lateral acceleration Glat in the meander running on the low $\mu$ road. Also after the steering angle $\theta$ is set to 0 in a transition period of turning change, the load movement control preceding the turning change is continued by the actual lateral acceleration Glat which is delayed with the change of the steering angle $\theta$. Consequently, the comparatively great yaw rate Y remains (delay A) so that the actual lateral acceleration Glat continues to be great. When the steering angle $\theta$ is very great after the turning change, the actual lateral acceleration Glat is sharply decreased (delay B).

Figure 17:
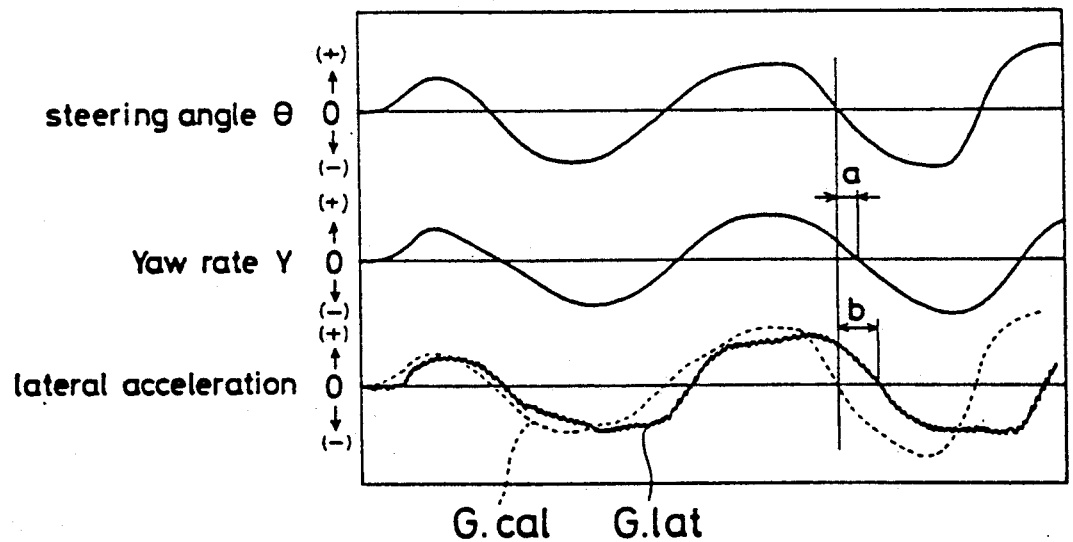
FIG. 17 is a diagram showing the relationship among a steering angle θ, a yaw rate Y and an actual lateral acceleration Glat according to the embodiment of the present invention.

FIG. 17 shows an embodiment in which both the actual lateral acceleration Glat and the calculated lateral acceleration G.cal are used.

When the calculated lateral acceleration G.cal is decreased correspondingly to the steering angle so as to be smaller than the actual lateral acceleration Glat in the transition period of the turning change, the control of the actual lateral acceleration Glat is changed to that of the calculated lateral acceleration G.cal of which absolute value is smaller. Consequently, the torque distribution ratio of the right and left wheels are quickly decreased correspondingly to the decrease of the steering angle $\theta$ so that the yaw rate Y and the actual lateral acceleration Glat are decreased. When the actual lateral acceleration G.lat and the calculated lateral acceleration G.cal have signs which are reverse to each other, the load movement control is stopped until they have the same signs. As a result, the actual lateral acceleration Glat is gradually decreased.

As described above, the torque distribution ratio of the right and left wheels are quickly decreased correspondingly to the decrease of the steering angle $\theta$, and the load movement control is stopped when the actual lateral acceleration Glat and the calculated lateral acceleration G.cal have signs which are reverse to each other. Consequently, there is not a possibility that the comparatively great yaw rate Y and the actual lateral acceleration Glat remain behind the change of the steering angle or that Glat is sharply changed as shown in FIG. 17 (Of course, the delays a and b of the yaw rate Y and actual lateral acceleration Glat are made smaller than the delays A and B of the comparative example).

The foregoing means that the turning change can smoothly be carried out in the meander running and the straight running can be attained at the time of turning escape.

On the high $\mu$ road, the present control is executed in a region in which the load movement rate (lateral acceleration) is comparatively great. Consequently, the running stability and operation of the car are not damaged. In addition, the unnecessary torque distribution control is forbidden so that a quantity of fuel to be exhausted can be limited and the brake can be prevented from being consumed.

On the low $\mu$ road, the present control is executed in a region in which the load movement rate is comparatively small. Consequently, the torque distribution for turning inside wheels is decreased so as to control the slip thereof and increase the grip force onto the road. Thus, the operation and stability of the car can be enhanced.

Turning state correspondence control

There will be described the cases where the turning start, constant turning and turning escape are carried out at a higher car speed than a preset one.

Turning start

Figure 12:
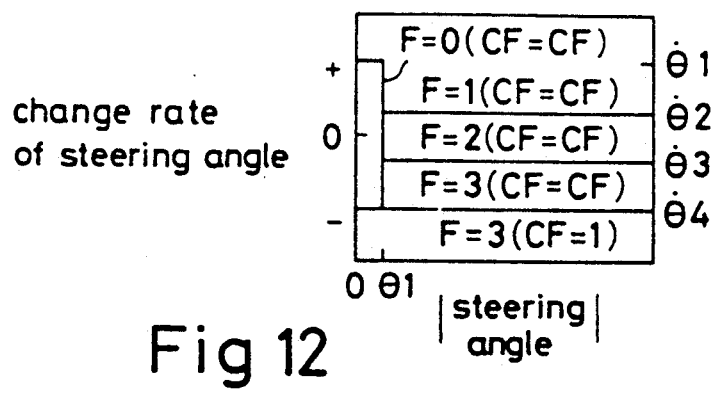
FIG. 12 is a map chart for turning state decision I.

The turning state decision I is carried out in accordance with a map shown in FIG. 12. If the steering angle is equal to or greater than $\theta 1$ and the change rate of steering angle having the plus sign is equal to or greater than $\dot{\theta}2$, or $\dot{\theta}1$, it is decided that F is equal to 1 (turning start). If the decision of the disturbance is not obtained in the straight running prior to the turning start, it is decided that CF is equal to 0. Accordingly, the turning escape is not forced in Step S49.

The lateral slide angle control causes the longitudinal distribution ratio R1 to be set such that the torque distribution for the rear wheels 8 and 9 is decreased when the lateral slide angle $\gamma$ of the rear wheels 8 and 9 is increased. However, it is decided that the turning is started. Consequently, correction control is executed in Step S36 shown in FIG. 10 so that the correction factors a and b are increased when the steering angle and change rate thereof are increased. Accordingly, R1 is set so as to be increased in the plus direction, i.e., such that the torque distribution for the front wheels 6 and 7 is decreased. Thus, the driving force of the front wheels 6 and 7 is absorbed by the brake so that the torque distribution for the front wheels 6 and 7 is decreased. As a result, the small turn of the car can be attained.

The lateral distribution ratio R2 is set by feed-back control such that the target yaw rate on the high $\mu$ road can be obtained by yaw rate correction. Consequently, the great yaw rate can be obtained on the low $\mu$ road so that the small turn of the car can be attained.

Constant turning

If the steering angle is equal to or greater than 1 and the change rate of steering angle is $\dot{\theta}2$ to $\dot{\theta}3$, it is decided that F is equal to 2 (constant turning) as a result of the turning state decision I. In this case, there is continued the decision that CF is equal to 0 in the turning start state.

Since F is equal to 2 as described above, the correction control is not executed by the steering angle of the longitudinal distribution ratio R1 and the like. However, when the turning of the car is continued on the low $\mu$ road, the lateral slide angle $\gamma$ of the rear wheels 8 and 9 is increased. Consequently, the longitudinal distribution ratio R1 of the lateral slide angle control is increased in the minus direction. Accordingly, the torque distribution for the rear wheels 8 and 9 is decreased so that the lateral slide of the rear wheels 8 and 9 can be prevented from being increased on the low $\mu$ road.

Turning escape

The turning state decision II is carried out in accordance with a map shown in FIG. 13 in the cases where the steering angle is equal to or greater than $\theta 1$ and the change rate of steering angle is $\dot{\theta}3$ to $\dot{\theta}4$ so that F is equal to 3 (turning escape) and CF is equal to CF and where the change rate of steering angle is equal to or smaller than $\dot{\theta}4$ so that F is equal to 3 and CF is equal to 1 as a result of the turning state decision I.

At the beginning of turning escape, when the steering angle is increased in the plus direction, the lateral acceleration is increased in the minus direction. Consequently, CF is set to 1. Also in case of left turning, when the steering angle is increased in the minus direction, the lateral acceleration is increased in the plus direction. Consequently, CF is set to 1. Accordingly, F is set to 3 again (Step S49).

In this case, the longitudinal distribution ratio R1 is increased in the minus direction by the lateral slide angle control and the correction control at the time of turning escape in Step S38 shown in FIG. 10 (both a and b are negative numbers). Consequently, the torque distribution for the rear wheels 8 and 9 is greatly decreased so that the lateral slide of the rear wheels 8 and 9 can be controlled.

If F is once set to 3, the turning state decision I and the disturbance decision are not carried out but the turning state decision II is carried out. When the turning escape is continued, the steering angle finally becomes 0 or a number having a reverse sign (for example, the sign is changed from plus to minus). Also in that case, if the lateral acceleration is greater than a predetermined value G1, CF=1 is maintained by the turning state decision II. Accordingly, the decision of F=3 (turning escape) is maintained.

Also after the completion of the turning, the longitudinal distribution ratio R1 is increased in the minus direction by the correction control at the time of turning escape in Step S38 shown in FIG. 10. Consequently, the torque distribution for the rear wheels 8 and 9 are limited so that the lateral slide of the rear wheels 8 and 9 are controlled. Thus, the straight running of the car can smoothly be carried out.

When the lateral acceleration is equal to or smaller than the predetermined value G1, CF is set to 0 by the turning state decision II. Consequently, the decision is NO in Step S48 to proceed to the turning state decision I.

Also in the cases where the change rate of steering angle is about 0, i.e., the constant turning is carried out before or after the steering angle is 0 and where the steering angle is increased again so that the turning is started, CF=1 is continued until the lateral acceleration is equal to or smaller than the predetermined value G1. Consequently, the decision of the turning escape is maintained. Thus, the torque distribution for the rear wheels 8 and 9 can be prevented from being increased irrespective of the lateral slide.

The case where it is decided that the change rate of steering angle is small so that F is equal to 3 and CF is equal to CF as a result of the turning state decision I;

In the case where the lateral acceleration is small so that CF is equal to CF as a result of the turning state decision II, CF is finally equal to 0 because CF is equal to 0 in the state of turning start or constant turning. Consequently, the decision is NO in Step S48 so that the result of the turning state decision I can be obtained. In the case where the car enters into the turning start state again after the turning escape state is once decided, the decision of F=1 is obtained. Consequently, the longitudinal distribution ratio R1 is made greater than 0, i.e., the torque distribution for the front wheels 6 and 7 is decreased by the correction control in Step S36 shown in FIG. 10. Thus, the small turn of the car can be attained.

The case where the change rate of steering angle is great so that F is equal to 3 and CF is equal to 1 as a result of the turning state decision I;

In this case, the movement of the car is sharply changed. Also in the case where the lateral acceleration is decreased for some reason so that CF is set to be equal to CF by the turning state decision II, CF is finally equal to 1. Consequently, it is possible to forcibly obtain the decision of F=3 (turning escape) in Step S49 so as not to carry out the turning state decision I. More specifically, in the case where the movement of the car is sharply changed, the decision of the turning escape can be maintained even if the driver corrects the steering so as to temporarily carry out the turning start or constant turning. Consequently, the torque distribution for the rear wheels 8 and 9 is decreased so that the change of movement of the car can quickly be controlled.

Figure 18:
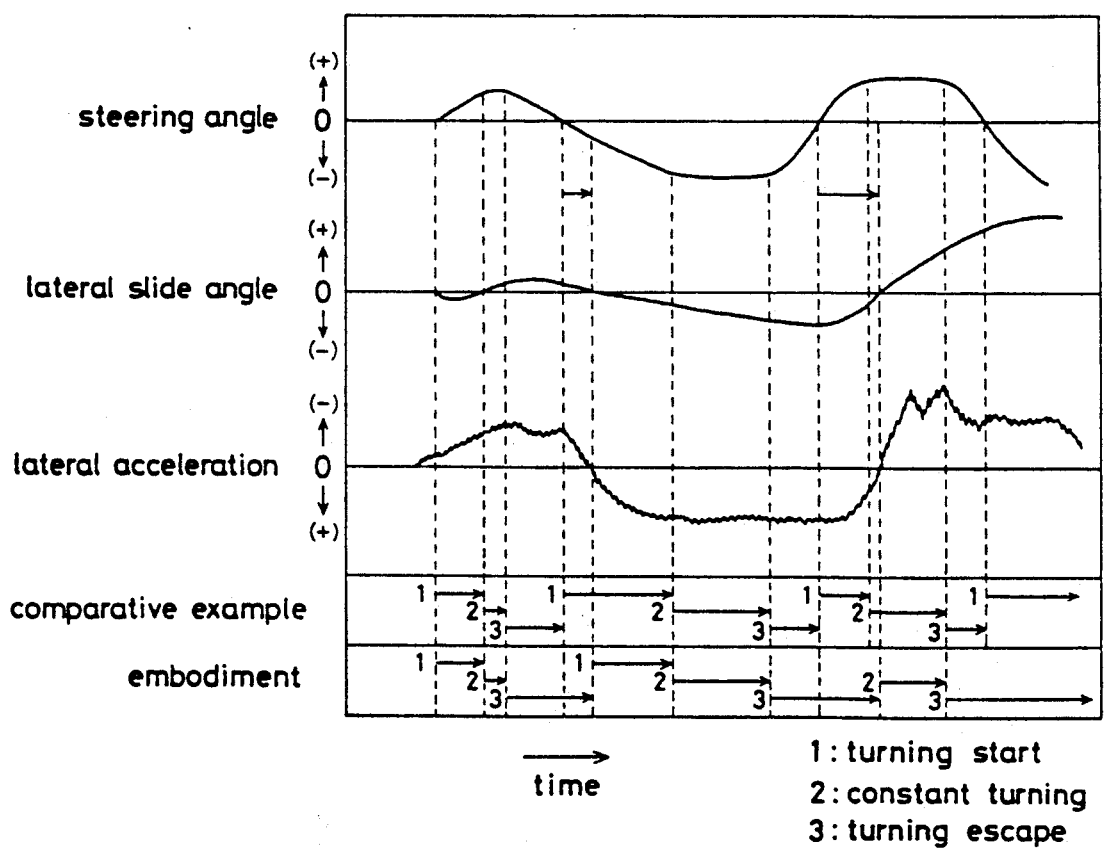
FIG. 18 is a graph which illustrates a comparison of the present invention with a conventional example in which the turning state is decided only by the change of the steering angle.

The foregoing can fully be understood with reference to FIG. 18. More specifically, FIG. 18 shows the comparison of the present embodiment with a conventional example in which the turning state is decided by only the change of the steering angle. As shown in FIG. 18, while the decision of the turning escape is completed when the steering angle becomes 0 in the conventional example, the decision of the turning escape is extended to a portion in which the turning start is conventionally decided in the present embodiment.

As described above, the lateral acceleration of the car is detected so as to maintain the decision of the turning escape. However, those skilled in the art will easily understand that the substantially same results can be obtained even if the lateral slide angle is used in place of the lateral acceleration.

According to the above-mentioned embodiment, the disturbance decision is carried out in the straight running according to a map shown in FIG. 14. Consequently, in the case where the car moves unsteadily owing to a great side wind at the time of straight running, CF is set to 1 so that F is forcibly set to 3, i.e., the decision of the turning escape is obtained. Consequently, the torque distribution for the rear wheels 8 and 9 is decreased so that the change of movement of the car can quickly be controlled.

Although the present invention has fully been described by way of example with reference to the accompanying drawings, it is to be understood that various changes and modifications will be apparent to those skilled in the art. Therefore, unless otherwise such changes and modifications depart from the scope of the invention, they should be construed as being included therein.

What is claimed is:

1. A torque distribution control apparatus for a four wheel drive in which four wheels of a car are driven by engine outputs comprising:
   torque distribution change means for controlling a quantity of said engine outputs to be transmitted to the four wheels so as to change the driving torque distribution for the four wheels;
   torque distribution control means for setting torque distribution ratios for the four wheels correspondingly to a lateral acceleration of the car and controlling the torque distribution change means on the basis of the torque distribution ratios;
   a steering angle sensor for detecting a steering angle;
   a car speed sensor for detecting a car speed;
   a lateral acceleration sensor for detecting an actual lateral acceleration of the car;
   lateral acceleration calculation means for calculating the lateral acceleration to occur on the car correspondingly to said steering angle and said car speed; and
   lateral acceleration selection means for selecting either the actual lateral acceleration obtained by said lateral acceleration sensor or the calculated lateral acceleration obtained by said lateral acceleration calculation means in order to execute torque distribution control.

2. A torque distribution control apparatus for a four wheel drive according to claim 1, wherein said lateral acceleration selection means selects either the actual lateral acceleration or the calculated lateral acceleration, of which absolute value is smaller.

3. A torque distribution control apparatus for a four wheel drive according to claim 2, wherein said torque distribution control means stops control when the actual lateral acceleration is one of a positive and negative number and the calculated lateral acceleration is the other of a positive and negative number.

4. A torque distribution control apparatus for a four wheel drive according to claim 2, further comprising:
   means for detecting the steering state of the car;
   turning state decision means for deciding whether the car is in a state of turning start or turning escape on the basis of the steering state thereof; and
   turning escape decision maintenance means for maintaining the decision of turning escape by fixing the decision of said turning state decision means until the actual lateral acceleration or a lateral slide angle is not greater than a predetermined value when said turning state decision means decides that the car is in the state of turning escape.
wherein said torque distribution control means receives signals from said turning state decision means and turning escape decision maintenance means and stops the control when at least one of the turning state decision means and the turning escape decision maintenance means ends a decision of a turning escape.

5. A torque distribution control apparatus for a four wheel drive according to claim 4, wherein said torque distribution control means includes means for setting said torque distribution ratios of the wheels correspondingly to the lateral acceleration of the car, and torque distribution ratio correction means for receiving the signals from said turning state decision means and turning escape decision maintenance means and differently correcting the torque distribution ratios of the wheels when it is decided that the car is in the state of turning start and turning escape.

6. A torque distribution control apparatus for a four wheel drive according to claim 5, wherein said torque distribution ratio correction means performs correction such that the torque distribution for rear wheels in the state of turning escape is made smaller than that in the state of turning start.

7. A torque distribution control apparatus for a four wheel drive according to claim 2, wherein said torque distribution control means completes the control when either the actual lateral acceleration or the calculated lateral acceleration, of which absolute value is greater, is equal to or smaller than a predetermined value.

* * * * *